United States Patent
Jacobson

[15] 3,701,550
[45] Oct. 31, 1972

[54] COUPLING DEVICE FOR PIPES WITH CIRCULAR CROSS SECTIONS

[72] Inventor: Gunnar Jacobson, Karlskoga, Sweden

[73] Assignee: Aktiebolaget Bofors, Bofors, Sweden

[22] Filed: March 8, 1971

[21] Appl. No.: 121,923

[30] Foreign Application Priority Data

March 19, 1970 Sweden .................3701/70

[52] U.S. Cl. ....................285/39, 151/28, 285/90, 285/175, 285/330, 285/397
[51] Int. Cl. ..................................F16l 17/00
[58] Field of Search........285/175, 39, 330, 370, 397, 285/84, 86, 89, 90, 92, 81, 82, 85; 287/2, 117; 151/2 R, 27, 28

[56] References Cited

UNITED STATES PATENTS

| | | | |
|---|---|---|---|
| 1,580,694 | 4/1926 | Smith | 285/86 X |
| 1,781,091 | 11/1930 | Wilson | 285/175 |
| 2,204,392 | 6/1940 | Arm | 285/81 X |
| 2,728,895 | 12/1955 | Quackenbush et al. | 285/85 X |

FOREIGN PATENTS OR APPLICATIONS 782,322 3/1935 France.................285/81

*Primary Examiner*—Dave W. Arola
*Attorney*—Hane, Baxley & Spiecens

[57] ABSTRACT

Two pipes having at their ends to be coupled internal threads of the opposite hand are coupled by a coupling ring which has corresponding external threads. Rotating of the coupling ring is effected by means of an intermediate member encompassing the ring axially displaceable thereon. A locking device in the form of movable guide rings is interposed between the coupling ring and the intermediate member. These guide rings have protrusions which are engageable with corresponding recesses at the ends of the pipes. In the event the threads on the coupling ring are initially engaged with the threads on one pipe end only, rotation of the intermediate member causes axial displacement thereof with respect to its position relative to the threads on the coupling ring thereby causing engagement of the threads on the coupling ring with the threads of the second pipe also. Upon completion of the threading operation the guide rings are in pressure engagement with the intermediate member so that the latter is locked in its position relative to the pipes thereby absorbing torsional forces as may occur between the coupling ring and the intermediate member.

9 Claims, 3 Drawing Figures

PATENTED OCT 31 1972 3,701,550

INVENTOR.
GUNNAR JACOBSON
BY Hane, Barley and
Siecens
ATTORNEYS

COUPLING DEVICE FOR PIPES WITH CIRCULAR CROSS SECTIONS

The present invention relates to a coupling device for pipes with circular cross sections where a first pipe on the inside and at one end has a left-hand thread and a second pipe also on the inside and at one end has a right-hand thread, which pipes can be connected together via a connecting member which has threads corresponding to the threads of the pipes, a peripherally extending intermediate part that can be actuated in the axial direction of the pipes then being placed on top of the connecting member which is connected to the intermediate part via a locking device which when the intermediate part is turned around the common center line of the pipes causes the connecting member to follow the turning and makes it possible to screw the first and second pipes on the connecting member simultaneously. The locking device is then also made in such a way that it permits a certain axial displacement of the intermediate part in relation to the member.

For coupling devices of this kind, there is a pronounced need that it should be possible to secure the pipes together, via the connecting member and the intermediate part, so that the pipes together with the coupling device form a unit in which the parts do not turn in relation to each other. It has then been proposed to introduce locking devices, for instance in the form of spring washers, between the two pipe ends facing each other and the intermediate part. However, this has substantial drawbacks in certain sophisticated applications when it is desired, to the greatest possible extent, to achieve an unbroken envelope surface at the joint, and to make the coupling device with the least possible thickness, with a view to obtaining the greatest possible aperture, and the intermediate part must then be made of material with extremely little thickness, which together with a rather large diameter of the pipes reduces the effectiveness of spring devices of said kind.

Another alternative for creating securing means has been to tighten up the threads very hard against the intermediate part, for the purpose of utilizing the elasticity of the material and the friction between the pipe ends and the intermediate part. However, it is then necessary that great forces and counter-forces are applied to the coupling device and pipes, and it also limits the choice of material, and further to this there will be unevenness in the envelope surface, and none of these cited drawbacks can be accepted in rather sophisticated applications. If there are also stringent requirements that the pipes are to be centered in relation to each other and that they must not be turned in relation to each other during connection operation, and that there are to be possibilities of easily connecting and disconnecting the two pipes, the known devices cannot be accepted as being possible alternatives for use.

The present invention solves all of the above-mentioned problems, and the feature that can be considered to be characteristic for a device according to the invention is that it has guide rings 11 and 12 which are movable in relation to the intermediate part and the connecting member when the device is being screwed on, and which is applied between said part and member and which moreover each are made as one unit or composed of two or a plurality of smaller arc formed parts, and that the guide rings are moreover provided with blocking parts which while the device is being screwed on engage in corresponding recesses located on the respective pipes, it then being possible for the respective pipes to displace the intermediate part axially in dependence of its position on the threads of the connecting member, and that the locking device is then also made in such a way so that after a manual actuation it will keep the guide rings pressed against the intermediate part so that this will be locked in relation to the pipes and absorb any torsional forces occurring between the member and the part.

A device having the characteristics significant for the inventiion will be described in the following, with reference to the attached drawing, in which FIG. 1 shows in perspective a coupling device located between two pipes with circular cross sections which can be connected together;

Figure 1:
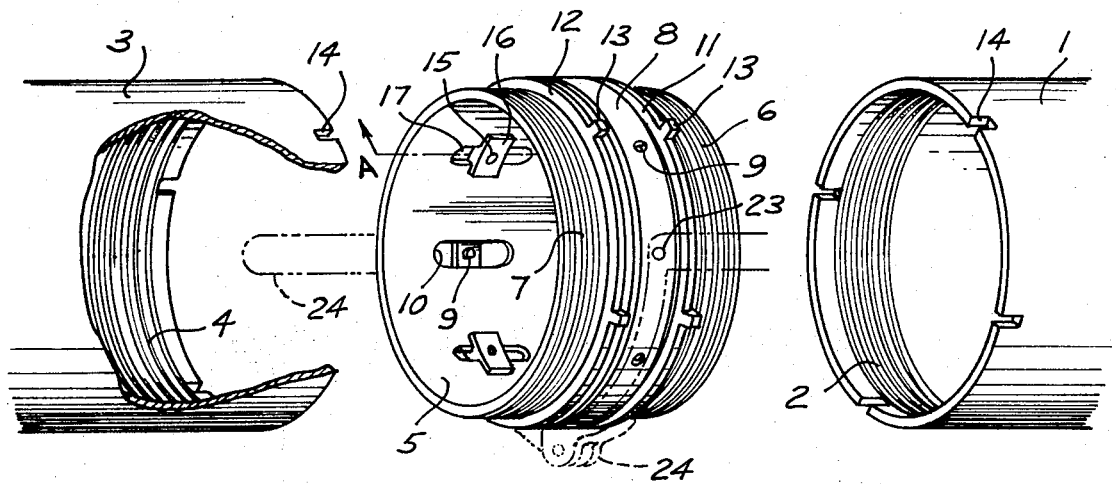

In FIG. 1, 1 designates a first pipe, which pipe at one end is provided with a left-hand thread 2 located on the inside of the pipe. A second pipe 3, which can be connected together with the first pipe, also has a right-hand thread located on the inside of one end. The pipes 1 and 3 are connected together via a connecting member 5 located on the coupling device, which member has the threads 6 and 7 corresponding to the threads 2 and 4 of the pipes. On top of the connecting member a peripherally extending intermediate part 8 which can be actuated is applied, the connecting member 5 and the intermediate part then being connected to each other via a locking device, which inter alia comprises two or more first screws 9 symmetrically located along the periphery of the connecting member. The first screws are fastened in the intermediate part and coact with recesses 10 located on the connecting member 5 which are comprised in the locking device, which recesses extend axially. The intermediate part 8 and the connecting member 5 will then be locked in relation to each other so that when the intermediate part is turned around the common center line of the pipes the connecting member will participate in the turning. If then the outer ends of the pipes are put in contact with the connecting member, when the turning takes place, the pipes will be screwed on the member 5. Since the recesses 10 extend axially, it is possible to displace the intermediate part axially, if it should be that the two pipes do not begin to be screwed on simultaneously.

Figure 2:
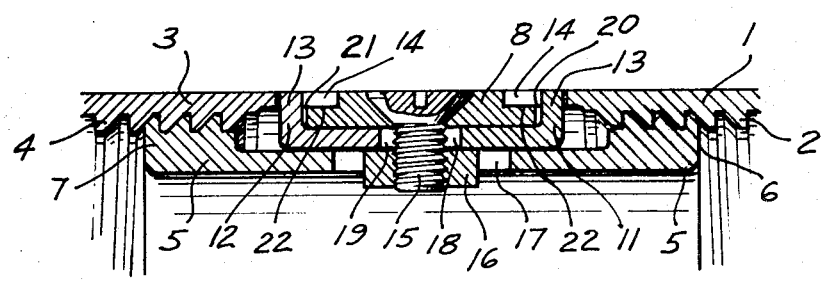
FIG. 2 shows in a vertical view a cross section of the coupling device according to FIG. 1.
Figure 3:
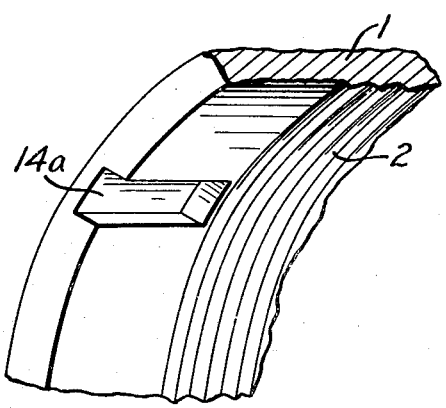
FIG. 3 shows a fragmentary perspective view of a modification of the pipes.

The coupling device also has two guide rings 11 and 12, the function and location of which between the connecting member 5 and the intermediate part 8 will be more clearly noted from FIG. 2. Each guide ring has four blocking parts 13, located symmetrically along the periphery of the ring, which blocking parts during the screwing engage in corresponding recesses 14 on the respective pipes. Said blocking parts, of which there is at least one on each guide ring, are located on a bent-up part of the guide ring. The recesses 14, which coact with the blocking parts can either extend all the way through the material at the end of the pipe in question or through only part of the material, and in the latter case the envelope surfaces of the pipes can be kept intact. FIG. 3 shows a recess 14a which extends only through part of the pipe wall. The figure shows recess 14a for pipe 1 but the recess in pipe 3 should be visualized as being similarly modified. Consequently, the guide rings are movable in relation to the intermediate part 8 and the connecting member 5 during the screwing operation.

The locking device also contains a predetermined number, of which in the example of the embodiment four have been chosen, of second screws 15, symmetrically located along the periphery of the intermediate part, which are provided with corresponding locking nuts 16, which second screws extend from the outside through recesses in the intermediate part 8 and the connecting member 5, the recesses 17 of which, in order to provide for said axial movement of the intermediate part in relation to the member, also extend axially. Each locking nut 16 has two pressing surfaces 18 and 19, against which parts of the respective guide rings 11 and 12 will come to bear when the guide rings during said screwing operation are pressed against the sides 20 and 21 of the intermediate part by the respective pipes 1 and 3. The other screws 15, which thus during the screwing operation have been in their loosened positions, can be tightened up when the pipes have been screwed on, for instance with a screw driver, and the guide rings will then be pressed against the intermediate part so that this will be secured in relation to the pipes.

In order to facilitate the manufacture (assembly) of the coupling device it is appropriate to make the intermediate part 8 and the guide rings 11 and 12 with slots, so that they can be forced apart and slipped over the threads of the connecting member 5.

At its outer ends, the intermediate part 8 also has guiding edges 22, coacting with the outer ends of the pipes, achieved in that recesses are made in the material which enable centering of the pipes in relation to the intermediate part and thereby also of the pipes to each other. From the above, it will also be obvious that, owing to the fact that the intermediate part can be moved axially, the pipes will fit closely to the intermediate part even if the places where the threads start on 2 and 6 and 4 and 7, respectively, are not adapted to each other.

If, at the screwing operation, the outer end of one pipe comes into contact with the intermediate part before the outer end of the other pipe, the first-mentioned pipe will displace the intermediate part towards the other pipe until they both press against the intermediate part. At this displacement, the guide rings will move along with the intermediate part since one of them will be actuated by the pushing pipe via its blocking devices, and the other will be actuated by the second screws 15. It will thus be possible for the respective pipe to displace the intermediate part axially in dependence of its position on the threads of the connecting member.

On the outside, the intermediate part is provided with recesses 23 which go through or partly through the material, which can easily be sealed, and in which a tool 24 for turning the intermediate part can be applied.

A modification of the device described above consists of the guide rings being replaced by two or more smaller arc-formed parts, which are applied after each other can the on the connecting member, so that they partly or entirely cover the periphery of the member.

The invention is not limited to the examples of the embodiment mentioned above, but can be subject to modifications within the scope of the following claims. Thus, for instance, the number of blocking parts and screws comprised in the locking device can be varied, appropriately depending upon the diameters of the pipes. If the tool for turning the intermediate part also reaches into the connecting member, the first screws 9 can be omitted. The second screws can possibly function as driving pins. The locking nuts are then provided with sections that engage in the recesses 17, so that they cannot rotate when the second screws are tightened.

I claim:

1. A coupling device for pipes, said pipe coupling device comprising in combination:

two pipes disposed in alignment with their facing ends spaced apart and having at their ends internal threads of the opposite hand, each of said pipe ends having in its rim at least one recess;

a tubular connecting member axially displaceably and rotatably fitted into the pipes between their ends thereof and having at its ends external threads engageable with the pipe end threads;

a tubular intermediate member rotatably and axially displaceably fitted upon said connecting member intermediate the ends thereof and also intermediate the pipe ends;

at least one guide ring rotatably and axially displaceably fitted between the connecting member and the intermediate member and rotatable relative to said members, said guide ring having at each peripheral edge an outwardly directed protrusion extending between the peripheral rim of the respective end of the intermediate member and the adjacent pipe end, each of said protrusions being engageable with the recess in respective pipe rim upon rotation of the guide ring into an angular position in which each of said protrusions and said recesses are in axial registry; and releasable locking means joining said members and said guide ring for joint rotation relative to the pipes, whereby, rotation of said members and said guide ring, with the locking means released, causes screwing of the connecting member threads upon the pipe end threads thus pulling the pipes toward each other and engagement of the guide ring protrusions with the pipe rim recesses, and subsequently locking of the locking means locks the members and the guide ring in said threading and engagement positions.

2. The coupling device according to claim 1 wherein said locking means comprise first guide means including at least one axially elongate slot in the peripheral wall of one of said members and a guide element extending through said slot into the other member to allow axial displacement of said members with reference to each other within the limits of said slot.

3. The coupling device according to claim 2 wherein said guide element comprises a screw screwed through said slot in one member into the other member.

4. The coupling device according to claim 1 wherein said locking means comprises a second guide means, said second guide means including a guide element extending through openings in said intermediate member, said guide ring and said connecting member, the openings in said members and the guide ring having a width providing for lateral displacement of said members and said guide ring relative to said guide element, clamping means on the guide element for engaging the intermediate member with a clamping grip and clamping said members and said ring against each other upon locking of said locking means.

5. The coupling device according to claim 4 wherein said clamping means comprise a headed screw extending through said members and said ring from the side of the intermediate member and a lock nut secured upon a portion of the screw protruding from the connecting member, the head of said screw having flanks engaging complementary surfaces on the intermediate member upon tightening of said screw.

6. The coupling device according to claim 1 wherein said intermediate member includes in a wall portion accessible from the outside of the device a recess for inserting thereunto a tool for rotating the intermediate member.

7. The coupling device according to claim 1 wherein said protrusion on the guide ring is movable into pressure engagement with the adjacent peripheral rim of the intermediate member upon rotating said members and said guide ring for securing the connecting member upon the threads of the pipe ends.

8. The coupling device according to claim 1 wherein said recesses in the pipe end rims extend through the entire thickness of the pipe walls of said rims.

9. The coupling device according to claim 1 wherein said recesses in the pipe end rims extends through part of the thickness of the pipe material of said rims.

* * * * *